US009092188B2

(12) United States Patent
Garrett et al.

(10) Patent No.: US 9,092,188 B2
(45) Date of Patent: *Jul. 28, 2015

(54) DISPLAY TRANSFORMATION ASSEMBLY FOR A VISUALIZATION SYSTEM

(71) Applicant: Mechdyne Corporation, Marshalltown, IA (US)

(72) Inventors: Chris Garrett, Newton, IA (US); Doug Betts, Albion, IA (US); Clint Collins, Bondurant, IA (US)

(73) Assignee: Mechdyne Corporation, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,052

(22) Filed: Apr. 18, 2014

(65) Prior Publication Data

US 2014/0226273 A1 Aug. 14, 2014

Related U.S. Application Data

(63) Continuation of application No. 12/655,843, filed on Jan. 8, 2010, now Pat. No. 8,733,028.

(51) Int. Cl.
| | |
|---|---|
| *B66B 9/02* | (2006.01) |
| *E04H 3/22* | (2006.01) |
| *G09B 9/00* | (2006.01) |
| *G06F 1/16* | (2006.01) |
| *H04N 5/64* | (2006.01) |

(52) U.S. Cl.
CPC .............. *G06F 1/1601* (2013.01); *H04N 5/64* (2013.01); *G06F 2200/1613* (2013.01)

(58) Field of Classification Search
CPC .. G06F 1/1601; G06F 2200/1613; H04N 5/64
USPC ............ 52/6, 29, 79.1, 7, 9, 36.1, 64; 434/55, 434/57, 67; 472/60, 76, 77, 79, 88, 91
See application file for complete search history.

(56) References Cited

U.S. PATENT DOCUMENTS

| | | | | | |
|---|---|---|---|---|---|
| 2,940,182 | A | * | 6/1960 | Halliday et al. | 434/25 |
| 3,012,337 | A | * | 12/1961 | Spencer, Jr. et al. | 434/43 |
| 3,083,473 | A | * | 4/1963 | Luton | 434/34 |
| 3,196,557 | A | * | 7/1965 | Davidsen et al. | 434/55 |
| 3,304,628 | A | * | 2/1967 | Kaplan | 434/58 |
| 3,514,871 | A | * | 6/1970 | Tucker | 434/44 |
| 3,531,898 | A | * | 10/1970 | Facemire | 52/6 |
| 4,164,080 | A | * | 8/1979 | Kosydar et al. | 434/38 |
| 4,236,359 | A | * | 12/1980 | Woolford | 52/66 |
| 4,373,169 | A | * | 2/1983 | Burkam | 348/123 |
| 4,418,911 | A | * | 12/1983 | Bowers et al. | 463/47 |

(Continued)

FOREIGN PATENT DOCUMENTS

GB 2378687 A * 2/2003

*Primary Examiner* — Rodney Mintz
(74) *Attorney, Agent, or Firm* — Brick Gentry PC; Brian J. Laurenzo; Jessica L. Susie

(57) ABSTRACT

A display retraction assembly for a multi-display visualization device is provided comprising a first track in a first vertical plane, a second track in a second vertical plane offset from the first track, a display support member operably connected to the first track and second track and a display connected to the display support member wherein the display is movable simultaneously with the display support member along the first track and second track.

5 Claims, 11 Drawing Sheets

(56) References Cited

U.S. PATENT DOCUMENTS

| | | | | |
|---|---|---|---|---|
| 4,473,355 A * | 9/1984 | Pongratz | | 434/44 |
| 4,634,384 A * | 1/1987 | Neves et al. | | 434/44 |
| 4,656,506 A * | 4/1987 | Ritchey | | 348/39 |
| 4,885,878 A * | 12/1989 | Wuu | | 52/6 |
| 5,130,794 A * | 7/1992 | Ritchey | | 348/39 |
| 5,137,450 A * | 8/1992 | Thomas | | 434/44 |
| 5,226,816 A * | 7/1993 | Hawkins | | 434/38 |
| 5,253,049 A * | 10/1993 | Brooke | | 348/36 |
| 5,316,480 A * | 5/1994 | Ellsworth | | 434/29 |
| 5,321,579 A * | 6/1994 | Brown et al. | | 361/679.06 |
| 5,433,670 A * | 7/1995 | Trumbull | | 472/60 |
| 5,448,287 A * | 9/1995 | Hull | | 348/39 |
| 5,487,665 A * | 1/1996 | Lechner et al. | | 434/44 |
| 5,496,220 A * | 3/1996 | Engstrand | | 472/60 |
| 5,509,806 A * | 4/1996 | Ellsworth | | 434/29 |
| 5,564,985 A * | 10/1996 | Engstrand | | 472/60 |
| 5,566,370 A * | 10/1996 | Young | | 348/36 |
| 5,623,878 A * | 4/1997 | Baxter et al. | | 104/85 |
| 5,662,523 A * | 9/1997 | Yasumaru et al. | | 463/30 |
| 5,721,585 A * | 2/1998 | Keast et al. | | 348/36 |
| 5,722,897 A * | 3/1998 | Engstrand | | 472/60 |
| 5,746,599 A * | 5/1998 | Lechner | | 434/44 |
| 5,752,834 A * | 5/1998 | Ling | | 434/58 |
| 5,818,639 A * | 10/1998 | Furuya | | 359/455 |
| 5,853,330 A * | 12/1998 | Engstrand | | 472/60 |
| 5,865,624 A * | 2/1999 | Hayashigawa | | 434/66 |
| 5,888,069 A * | 3/1999 | Romanoff et al. | | 434/33 |
| 5,926,153 A * | 7/1999 | Ohishi et al. | | 345/1.1 |
| 5,927,985 A * | 7/1999 | Lechner | | 434/44 |
| 5,975,907 A * | 11/1999 | Advani | | 434/29 |
| 6,027,247 A * | 2/2000 | Tachi et al. | | 378/196 |
| 6,043,854 A * | 3/2000 | Scott | | 348/744 |
| 6,152,739 A * | 11/2000 | Amery et al. | | 434/38 |
| 6,166,744 A * | 12/2000 | Jaszlics et al. | | 345/629 |
| 6,176,584 B1 * | 1/2001 | Best et al. | | 353/30 |
| 6,190,172 B1 * | 2/2001 | Lechner | | 434/44 |
| 6,195,184 B1 * | 2/2001 | Chao et al. | | 359/32 |
| 6,261,100 B1 * | 7/2001 | Bragdon | | 434/29 |
| 6,279,761 B1 * | 8/2001 | Niewiadomski et al. | | 211/94.01 |
| 6,354,838 B1 * | 3/2002 | Tagge et al. | | 434/62 |
| 6,367,934 B1 * | 4/2002 | Salesky et al. | | 353/74 |
| 6,536,063 B1 * | 3/2003 | Blase | | 14/31 |
| 6,550,921 B1 * | 4/2003 | Monson | | 353/122 |
| 6,594,078 B2 * | 7/2003 | Clifton et al. | | 359/449 |
| 6,639,623 B2 * | 10/2003 | Howell et al. | | 348/36 |
| 6,665,985 B1 * | 12/2003 | Hennes | | 52/7 |
| 6,681,529 B1 * | 1/2004 | Baloga et al. | | 52/29 |
| 6,695,270 B1 * | 2/2004 | Smed | | 248/274.1 |
| 6,739,096 B2 * | 5/2004 | Feldpausch et al. | | 52/36.1 |
| 6,758,454 B2 * | 7/2004 | Smed | | 248/314 |
| 6,857,712 B1 * | 2/2005 | Haberman | | 312/223.3 |
| 6,892,650 B2 * | 5/2005 | Baloga et al. | | 108/50.01 |
| 6,899,442 B2 * | 5/2005 | Howell et al. | | 362/147 |
| 6,944,581 B2 * | 9/2005 | Creek | | 703/6 |
| 6,986,556 B2 * | 1/2006 | Haberman | | 312/223.3 |
| 6,989,800 B2 * | 1/2006 | McLaughlin | | 345/1.3 |
| 7,019,786 B2 * | 3/2006 | Lee | | 348/383 |
| 7,025,466 B2 * | 4/2006 | Hoffmeister et al. | | 353/119 |
| 7,033,177 B2 * | 4/2006 | Kim | | 434/58 |
| 7,063,296 B2 * | 6/2006 | Williams | | 248/285.1 |
| 7,125,088 B2 * | 10/2006 | Haberman | | 312/223.3 |
| 7,134,719 B2 * | 11/2006 | Moglin et al. | | 297/217.3 |
| D563,917 S * | 3/2008 | Kobayashi et al. | | D14/127 |
| 7,377,078 B2 * | 5/2008 | Golino et al. | | 52/36.4 |
| 7,414,595 B1 * | 8/2008 | Muffler | | 345/7 |
| D593,516 S * | 6/2009 | Orne et al. | | D14/127 |
| 7,593,217 B2 * | 9/2009 | Shahrokhi | | 361/679.01 |
| 7,763,015 B2 * | 7/2010 | Cooper et al. | | 606/1 |
| 7,992,349 B2 * | 8/2011 | Haberman | | 52/36.1 |
| 8,035,680 B2 * | 10/2011 | Mader et al. | | 348/36 |
| 8,123,526 B2 * | 2/2012 | Hoover et al. | | 434/21 |
| 8,142,296 B2 * | 3/2012 | Larsen | | 472/94 |
| 8,154,859 B2 * | 4/2012 | Shahrokhi | | 361/679.01 |
| 8,194,193 B2 * | 6/2012 | Streid et al. | | 348/744 |
| 8,255,190 B2 * | 8/2012 | Hala et al. | | 703/1 |
| 8,348,931 B2 * | 1/2013 | Cooper et al. | | 606/1 |
| 8,360,893 B2 * | 1/2013 | Howard | | 472/43 |
| 8,373,746 B2 * | 2/2013 | Smith | | 348/51 |
| 8,381,460 B1 * | 2/2013 | McDermott | | 52/118 |
| 8,405,704 B2 * | 3/2013 | Kobayashi et al. | | 348/14.09 |
| 8,435,126 B2 * | 5/2013 | Davis | | 472/77 |
| 8,462,103 B1 * | 6/2013 | Moscovitch et al. | | 345/156 |
| 8,733,028 B2 * | 5/2014 | Garrett et al. | | 52/29 |
| 8,905,496 B2 * | 12/2014 | Burgess et al. | | 312/247 |
| 2002/0015296 A1 * | 2/2002 | Howell et al. | | 362/11 |
| 2002/0194791 A1 * | 12/2002 | Baloga et al. | | 52/36.1 |
| 2003/0119591 A1 * | 6/2003 | Frazier et al. | | 472/88 |
| 2003/0224333 A1 * | 12/2003 | Vastvedt | | 434/29 |
| 2004/0031894 A1 * | 2/2004 | Smed | | 248/278.1 |
| 2004/0036845 A1 * | 2/2004 | Hoffmeister et al. | | 353/79 |
| 2004/0077417 A1 * | 4/2004 | Zambelli et al. | | 472/88 |
| 2004/0172887 A1 * | 9/2004 | Moglin et al. | | 52/36.1 |
| 2004/0251388 A1 * | 12/2004 | Williams | | 248/274.1 |
| 2005/0016081 A1 * | 1/2005 | Gomree et al. | | 52/36.1 |
| 2005/0086876 A1 * | 4/2005 | Clark | | 52/79.1 |
| 2005/0127253 A1 * | 6/2005 | Kim | | 248/176.1 |
| 2005/0277092 A1 * | 12/2005 | Hwang | | 434/55 |
| 2006/0113445 A1 * | 6/2006 | Parsons | | 248/276.1 |
| 2007/0111864 A1 * | 5/2007 | Schmidt | | 482/70 |
| 2007/0130845 A1 * | 6/2007 | Halverson | | 52/79.1 |
| 2007/0204527 A1 * | 9/2007 | Clark | | 52/79.1 |
| 2007/0273757 A1 * | 11/2007 | Mader et al. | | 348/36 |
| 2008/0081706 A1 * | 4/2008 | Zamperla et al. | | 472/44 |
| 2008/0127275 A1 * | 6/2008 | Quinn et al. | | 52/79.5 |
| 2008/0128574 A1 * | 6/2008 | Walters et al. | | 248/324 |
| 2008/0143696 A1 * | 6/2008 | Goulthorpe | | 345/204 |
| 2008/0254416 A1 * | 10/2008 | Claudinon et al. | | 434/55 |
| 2008/0302026 A1 * | 12/2008 | Halverson | | 52/79.1 |
| 2008/0307717 A1 * | 12/2008 | Heppner | | 52/64 |
| 2009/0066858 A1 * | 3/2009 | Turner et al. | | 348/744 |
| 2009/0163931 A1 * | 6/2009 | Cooper et al. | | 606/130 |
| 2009/0246741 A1 * | 10/2009 | Soodeen et al. | | 434/55 |
| 2010/0064596 A1 * | 3/2010 | Bowsher | | 52/29 |
| 2010/0140046 A1 * | 6/2010 | Flessas | | 198/321 |
| 2010/0266994 A1 * | 10/2010 | Gregoire et al. | | 434/55 |
| 2011/0017892 A1 * | 1/2011 | Parsons | | 248/286.1 |
| 2011/0136581 A1 * | 6/2011 | Cortelyou et al. | | 472/131 |
| 2011/0168653 A1 * | 7/2011 | Garrett et al. | | 211/59.4 |
| 2011/0172791 A1 * | 7/2011 | Hala et al. | | 700/90 |
| 2012/0105742 A1 * | 5/2012 | Davis et al. | | 348/839 |
| 2012/0184385 A1 * | 7/2012 | Davis | | 472/77 |
| 2012/0277764 A1 * | 11/2012 | Cooper et al. | | 606/130 |
| 2012/0282588 A1 * | 11/2012 | Stevens et al. | | 434/365 |
| 2012/0312186 A1 * | 12/2012 | Shasha et al. | | 104/93 |
| 2013/0139450 A1 * | 6/2013 | Scott, IV | | 52/79.1 |
| 2013/0232885 A1 * | 9/2013 | Gallant et al. | | 52/29 |
| 2013/0334376 A1 * | 12/2013 | Moscovitch | | 248/125.1 |
| 2014/0092318 A1 * | 4/2014 | Carrillo et al. | | 348/843 |
| 2015/0015781 A1 * | 1/2015 | Flessas | | 348/383 |
| 2015/0015785 A1 * | 1/2015 | Flessas | | 348/552 |
| 2015/0092116 A1 * | 4/2015 | McCullough | | 348/838 |

* cited by examiner

DISPLAY TRANSFORMATION ASSEMBLY FOR A VISUALIZATION SYSTEM

CROSS REFERENCE TO RELATED APPLICATIONS

This application is a continuation of U.S. patent application Ser. No. 12/655,843, filed on Jan. 8, 2010 entitled DISPLAY TRANSFORMATION ASSEMBLY FOR A VISUALIZATION SYSTEM, the entire disclosure of which is hereby incorporated by reference.

FIELD OF THE INVENTION

The present invention relates to visualization systems. More specifically, the present invention relates to a transformation assembly for selective application of display elements on a visualization system.

BACKGROUND

Multi-display visualization systems, or systems having multiple displays integrated to display a continuous image, provide users the opportunity for physical immersion in data. Data is wide ranging and may include, but is not limited to, geophysical exploration, manufacturing design, computational fluid dynamics, seismic interpretation and well planning, biotechnology research, medical field training, research analysis, and interactive simulations. Multi-display visualization systems allow a user to analyze and interpret spatially related data quickly with multiple, surrounding screens. Further, multi-display visualization systems enhance awareness retention by engaging the entire brain of a user through physical and sensory immersion. These systems also enable a user to intuitively navigate realistic, life-size environments. Multi-display visualization systems may also incorporate stereoscopic technology for the display of three-dimensional imagery and motion tracking technology to enable interactive interface with the visualization system.

Multi-display visualization systems may include one or more displays positioned at the eye level of a user. For example, this arrangement may include a forward display surrounded by one or more side displays. Further, the visualization system may include an overhead or ceiling display or a floor display. The structural arrangement of the system enables a seamless presentation of images between displays.

Each display may include a screen having a projection element, for example an image projector. The projector may be positioned behind the screen, or on the opposite side of the screen from the user. An image may then be projected from the projector toward the screen, enabling a user to view the image on the screen without seeing the projection element. The displays are integrated through a computer processing platform which transforms the desired data into separate images. Each of the separate images are projected on a corresponding display. The combination of the processing platform, display arrangement and the seamless transition between displays enables a user to view the separate display images as a single, continuous visual image.

These visualization systems have numerous practical advantages. For example, combat soldiers may be safely trained through immersion in simulated scenarios which may otherwise present a substantial risk of injury or death to a trainee. The scenarios may include simulations of aerial, ground or sea combat conditions. Further, these visualization systems allow for interactive research or design by placing a user inside the selected data. For example, a surgeon may develop new surgical techniques through interaction with or immersion within a simulated patient. In another example, geologists may explore or research underground areas of the earth without the high cost or need for extensive drilling. The listed advantages above are merely exemplary and not limiting.

However, multi-display visualization systems currently in use have physical limitations when constructed or integrated into a building or structure. A visualization system having both a ceiling display and a floor display requires substantial structural provisions for proper installation. As indicated above, each display may have a projection element positioned behind or on the non-user side of each associated display screen. A standard room in a building or structure may not have the necessary height to address the spatial requirements for proper housing and operation of both the ceiling and floor displays. Accordingly, a specially constructed custom room having sufficient height to house the entire visualization system is often necessary. In situations where a custom room is either cost or space prohibited, a subfloor and/or a vaulted subceiling may be constructed to house the ceiling and floor display equipment. However, this also can entail substantial construction costs and result in the loss of potentially limited space on the floors above and/or below the visualization system.

When construction of a custom room or a subfloor I subceiling is not practicable, a user of a multi-display visualization system may choose the alternative of selecting between a ceiling or floor display. When space is limited, currently the least expensive approach is to mount a projection element overhead, above the visualization system. In this arrangement, a projection element is positioned overhead or above the visualization system and projects downward, either on a ceiling screen or on a floor screen. These multi-display visualization systems currently in use do not allow for the selective removal of a ceiling display screen due to the tight alignment tolerances between displays required to produce a seamless image.

Accordingly, it would be desirable to have a device which provides a user of a multi-display visualization system the option to display an image on either a ceiling display or on a floor display without necessitating the added expense of a specialized structure. Further, it would be advantageous to have a device which allows a user to easily retract and replace a ceiling display while maintaining the alignment tolerances with other displays to preserve a seamless image.

SUMMARY OF THE INVENTION

A transformation assembly is provided for selective operation of one or more visual displays. The assembly includes a first track in a first vertical plane and a second track in a second vertical plane offset from the first track. A display support member is operably connected to the first track and second track. A display is connected to the display support member wherein the display is movable simultaneously with the display support member along the first track and second track.

In another embodiment of a retraction assembly, the assembly includes a first longitudinally extending track assembly and a second longitudinally extending track assembly. The second longitudinally extending track assembly has a track portion and a sloped portion, the track portion arranged parallel to the first longitudinally extending track assembly and the sloped portion arranged at a variable angle from the track portion. A support member is pivotally connected to the first track assembly at a first position on the support member, enabling the support member to pivot about and traverse the first track assembly, the support member operably connected to the second track assembly, enabling the support member to traverse the second track assembly. A structural assembly is pivotally connected to the support member at a second position on the support member, enabling the support member to pivot about the structural assembly.

In another embodiment of a retraction assembly for a visualization system display, the assembly includes a first track and a second track positioned below the first track, the second track having a channel portion parallel to the first track and a sloped portion at an angle to the channel portion. The assembly further includes a slidable assembly carrying a pivot member and a wheel assembly, the wheel assembly having a wheel for engaging and traversing the first track. The assembly includes a support member carrying a bearing housing at a first position on the support member, a roller bracket assembly and a hinge assembly at a second position on the support member, the bearing housing receiving the pivot member to pivotally connect the support member to the slidable assembly, the roller bracket assembly carrying a roller for engaging and traversing the second track. A structural assembly is connected to the hinge assembly, enabling the support member to pivot about the structural assembly.

DETAILED DESCRIPTION

The following presents one or more examples of embodiments of a multi-display visualization system 100 having a transformation assembly 200 for one or more displays. For ease of discussion and understanding, the following detailed description and illustrations refer to a multi-display visualization system 100 having a plurality of wall displays in addition to a ceiling display and a floor display. It should be appreciated that the illustrated multi-display visualization system 100 is provided for purposes of illustration, and the transformation assembly 200 may be used with any type, style or arrangement of visualization systems for which having a selective display of an image on a ceiling display or on a floor display would be advantageous.

Figure 1:
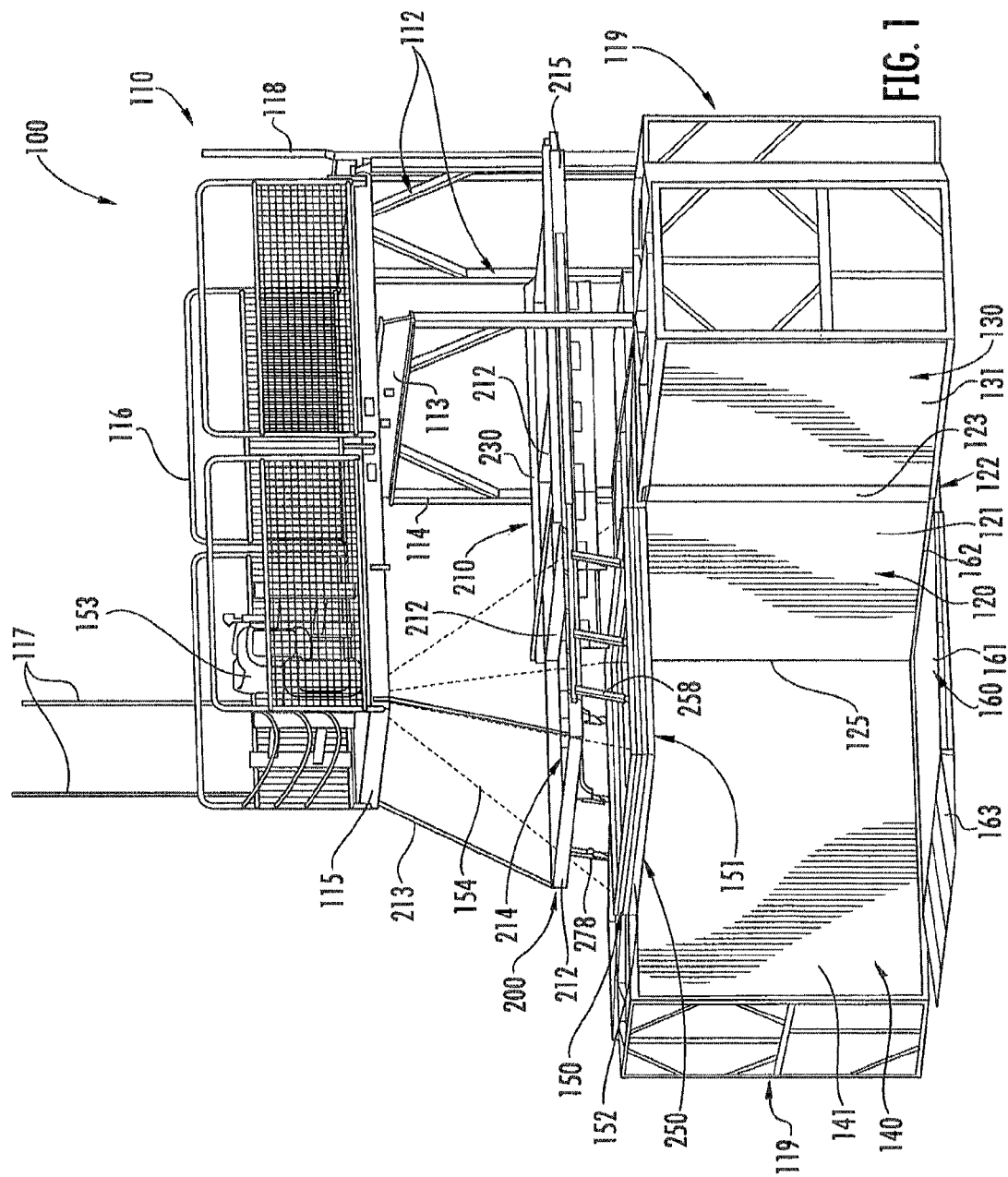
FIG. 1 is a side elevation view of a multi-display visualization system having a transformation assembly attached thereto with the ceiling display in the closed position.

FIG. 1 illustrates a multi-display visualization system 100 in accordance with one of more examples of embodiments of the present invention. The visualization system 100 may include a system superstructure 110, a plurality of displays or display elements 120, 130, 140, 150, 160 and a transformation assembly 200.

The system superstructure 110 may include a support assembly 112. The support assembly may include one or more horizontal supports 113 and one or more vertical supports 114. The support assembly 112 may be formed of steel, iron, wood, plastic, composite material or any other known or future developed suitable material of sufficient strength and rigidity to support the multi-display visualization system 100.

Connected to the support assembly 112 may be a walkway or bridge or catwalk 115. The catwalk 115 may be positioned above the support assembly 112. Connected to the catwalk 115 may be one or more railings 116. Connected to the catwalk may be one or more connection or reinforcing rods 117. The rods 117 connect to a portion of the building housing the visualization system 100, for example the ceiling of the room containing the visualization system 100. The catwalk 115 may include a ladder 118 to allow for access to the catwalk 115. The catwalk 115, railings 116, reinforcing rods 117, and ladder 118 may be formed of the same or similar materials as the support assembly 112.

The support assembly 112 may be connected to a display support assembly or framework 119. The display support assembly 119 has a plurality of frame members which support one or more horizontal displays 120, 130, 140. The display support assembly 119 may be formed of the same or similar materials as the support assembly 112.

As seen in FIG. 1, the display support assembly 119 carries or supports a first or front display 120. The front display 120 has a first or front screen 121 and a first or front projection element or projector (not shown). The projector may be received within the display support assembly 119 behind the front screen 121. The projector may then project an image upon the front screen 121. In one or more examples of embodiments, the front display 120 may be of any height, length and/or width, and may be of any shape for projecting an image, including, but not limited to circular, square, rectangular, or other polygonal shape. Further, the front display 120 may be formed of any known suitable material or future developed display device, for example, but not limited to, a rear-projection display, a liquid crystal display (LCD), a laser video display, a plasma display panel (PDP), or nanocrystal display. In one or more examples of embodiments, the projector may project an image toward a mirror which may reflect or bounce the image toward the screen 121.

As seen in FIG. 1, the display support assembly 119 may also carry or support a second or right display 130. The right display 130 has a second or right screen 131 and a second or right projection element or projector (not shown). The projector may be received within the display support assembly 119 behind the right screen 131. The projector may then project an image upon the right screen 131. In one or more examples of embodiments, the right display 130 may be of any height, length and/or width, and of any shape for projecting an image, including, but not limited to circular, square, rectangular, or other polygonal shape. Further, the right display 130 may be formed of any known suitable material or future developed display device, for example, but not limited to, a rear-projection display, a liquid crystal display (LCD), a laser video display, a plasma display panel (PDP), or nanocrystal display. In one or more examples of embodiments, the projector may project an image toward a mirror which may reflect or bounce the image toward the screen 131.

The right display 130 may be pivotally connected to the front display 120 by a first or right pivot assembly 122. The right pivot assembly 122, as shown in FIG. 1, has a first or right seam portion 123 which enables a seamless image between the front display 120 and right display 130. The right pivot assembly 122 includes a right pivot member (not shown) which enables the right display 130 to rotate about the front display 120. The right pivot member may be a hinged member, for example, but not limited to, a pivot hinge, pin hinge, barrel hinge or any other known or future developed hinged member with sufficient strength and rigidity to pivot displays 120, 130. The right display 130 may rotate about the right pivot assembly 122 from a position approximately parallel to the front display 120 to a position approximately at a right angle to the front display 120. As illustrated in FIGS. 1, 3, 5 and 7, the right display 130 may be positioned approximately parallel to the front display 120. In one or more examples of embodiments, the right display 130 may be arranged at any position between approximately parallel to the front display 120 to approximately at a right angle to the front display 120. The right seam portion 123 is adapted or aligned to provide a seamless image between front display 120 and right display 130 at any position the right display 130 may be in relation to the front display 120.

Referring to FIG. 1, the display support assembly 119 may carry or support a third or left display 140. The left display 140 has a third or left screen 141 and a third or left projection element or projector (not shown). The projector may be received within the display support assembly 119 behind the left screen 141. The projector may then project an image upon the left screen 141. In one or more examples of embodiments, the left display 140 may be of any height, length and/or width, and may be of any shape for projecting an image, including, but not limited to circular, square, rectangular, or other polygonal shape. Further, the left display 140 may be formed of any known suitable material or future developed display device, for example, but not limited to, a rear-projection display, a liquid crystal display (LCD), a laser video display, a plasma display panel (PDP), or nanocrystal display. In one or more examples of embodiments, the projector may project an image toward a mirror which may reflect or bounce the image toward the screen 141.

The left display 140 may be pivotally connected to the front display 120 by a second or left pivot assembly (not shown). The left pivot assembly may be the same as the right pivot assembly 122. The left pivot assembly (not shown) may include a second or left seam portion 125 which enables a seamless image between the front display 120 and left display 140. The left pivot assembly (not shown) includes a left pivot member (not shown) which enables the left display 140 to rotate about the front display 120. The left pivot member may be a hinged member, for example, but not limited to, a pivot hinge, pin hinge, barrel hinge or any other known or future developed hinged member with sufficient strength and rigidity to pivot displays 120, 140. The left display 140 may rotate about the left pivot assembly (not shown) from a position approximately parallel to the front display 120 to a position approximately at a right angle to the front display 120. As illustrated in FIGS. 1, 3, 5, and 7, the left display 140 is positioned approximately at a right angle to the front display 120. In one or more examples of embodiments, the left display 140 may be arranged at any position between approximately parallel to the front display 120 to approximately at a right angle to the front display 120. The left seam portion 125 is adapted to provide a seamless image between front display 120 and left display 140 at any position the left display 140 may be in relation to the front display 120.

The left display 140 pivots about front display 120 independently of the right display 130, allowing for a combination of horizontal display 120, 130, 140 arrangements. As illustrated in FIGS. 1, 3, 5 and 7, left display 140 may be arranged approximately at a right angle to the front display 120 while right display 130 may be approximately parallel to the front display 120. This arrangement of horizontal displays 120, 130, 140 forms an L-shape configuration. In one or more examples of embodiments, the left display 140 may be arranged approximately parallel to the front display 120 while right display 130 may be approximately at a right angle to the front display 120. This arrangement of horizontal displays 120, 130, 140 also forms an L-shape configuration. Further, in one or more examples of embodiments, the right and left displays 130, 140 may both be arranged approximately parallel to the front display 120, forming a flat wall configuration. In one or more examples of embodiments, the right and left displays 130, 140 may both be arranged at various angles to the front display 120, forming an angled wall configuration. Further, the right and left displays 130, 140 may both be approximately arranged at a right angle to the front display 120, forming an enclosed or cave configuration. In the enclosed configuration, the horizontal displays 120, 130, 140 form three walls of an immersive visualization system or room.

Figure 2:
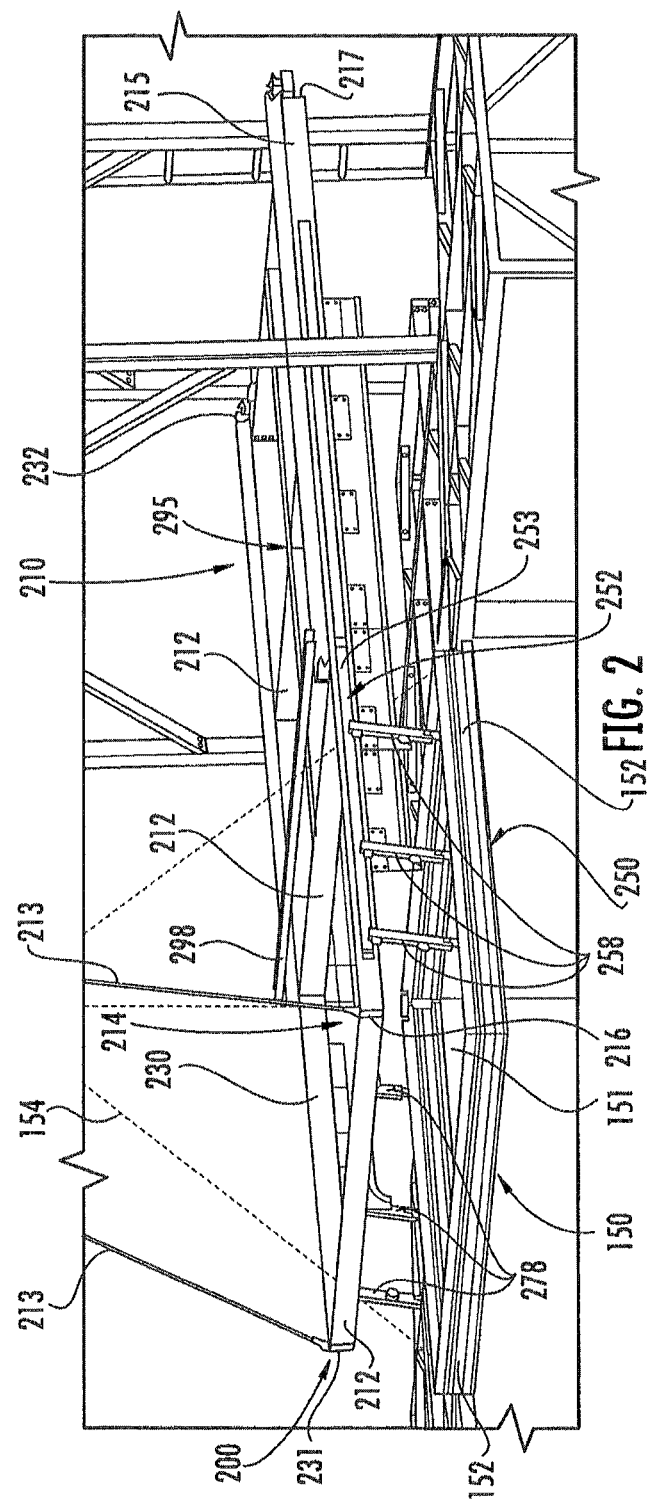
FIG. 2 is a sectional isometric view of the multi-display visualization system of FIG. 1, having portions cut off to show the transformation assembly having the ceiling display attached thereto in the closed position.

Referring to FIG. 1, the support assembly 112 and/or display support assembly 119 may support a fourth or upper or ceiling display 150. As illustrated in FIGS. 1 and 2, the ceiling display 150 has an upper or ceiling screen 151 which may be carried or surrounded by an upper or ceiling screen frame 152. As shown in FIG. 1, an upper projection element or projector 153 is positioned above the ceiling display 150 and carried or attached to catwalk 115. The upper projector 153 may project an upper or ceiling image 154, illustrated in FIGS. 1 and 2 by broken lines. In one or more examples of embodiments, the ceiling display 150 may be of any height, length and/or width, and of any shape for projecting an image, including, but not limited to circular, square, rectangular, or other polygonal shape. In one or more examples of embodiments, the projector 153 may be formed of any suitable or future developed image projection device.

Figure 7:
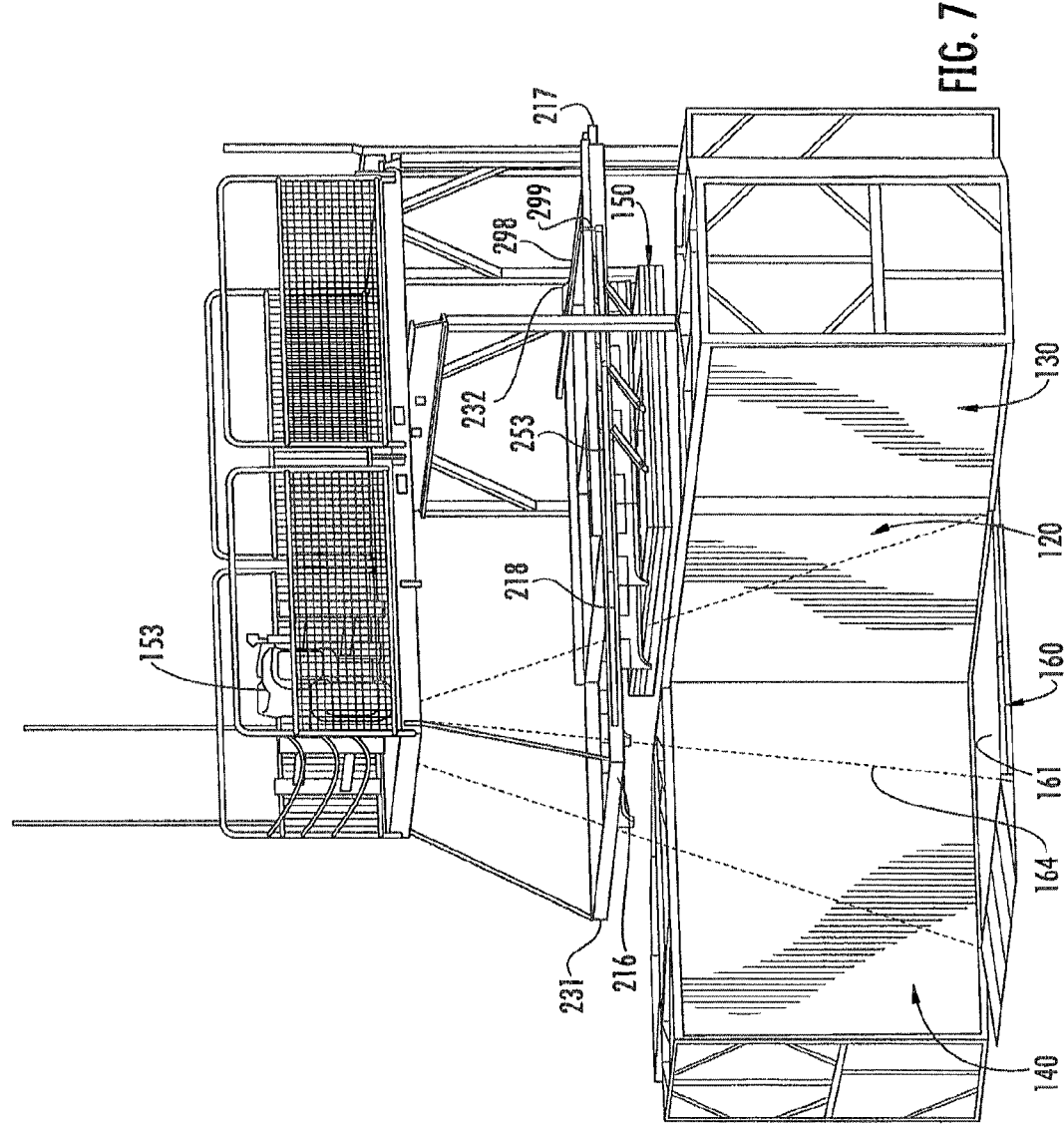
FIG. 7 is a side elevation view of the multi-display visualization system of FIG. 1 having the transformation assembly attached thereto with the ceiling display in the open position.
Figure 8:
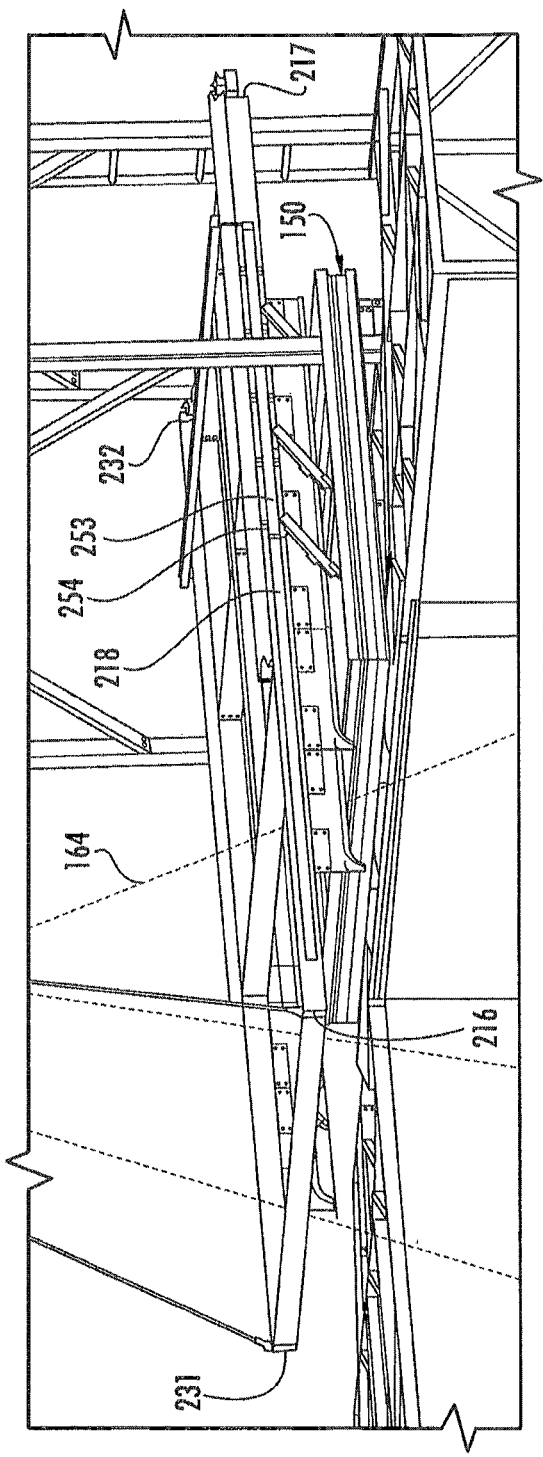
FIG. 8 is a sectional isometric view of the multi-display visualization system of FIG. 1, having portions cut off to show the transformation assembly having the ceiling display attached thereto in the open position.

As illustrated in FIG. 1, the multi-display visualization system 100 may include a fifth or lower or floor display 160. The floor display 160 has a lower or floor screen 161. As shown in FIGS. 7 and 8, the upper projection element or projector 153 may project a lower or floor image 164 onto the floor display 160, illustrated by broken lines. Referring back to FIG. 1, the floor display 160 may be connected to the front display 120 at a lower or floor seam portion 162 which enables a seamless image between the front display 120 and floor display 160. The floor display 160 may include an access assembly or ramp 163 to provide user access to the visualization system 100. In one or more examples of embodiments, the floor display 160 may be of any height, length and/or width, and of any shape for projecting an image, including, but not limited to circular, square, rectangular, or other polygonal shape. In one or more examples of embodiments, the access assembly 163 may include any applicable access device, including, but not limited to steps.

The screens 121, 131, 141, 151, 161 described herein may be formed of high tension, flexible membranes. For example, the screens may be formed of a soft vinyl material. In one or more examples of embodiments, the screens 121, 131, 141, 151, 161 may be formed of a rigid material, for example, an acrylic material. In one or more examples of embodiments, the screens 121, 131, 141, 151, 161 may be formed of any known or future developed material sufficient to display an image. The screens 121, 131, 141, 151, 161 may be secured or attached to displays 120, 130, 140, 150, 160 by nail, bolt, adhesive, by a surrounding frame or any other known or future developed method of attachment.

As shown in FIG. 1, the multi-display visualization system 100 includes a transformation assembly 200. The transformation assembly 200 has a track assembly 210 and a retraction assembly 250. The transformation assembly 200 is carried by the visualization system 100 through one or more connections to the system superstructure 110. As shown in the Figures, the transformation assembly 200 is positioned above the horizontal displays 120, 130, 140 and below the catwalk 115. The transformation assembly 200 may be formed of steel, iron, wood, plastic, composite material or any other known or future developed suitable material of sufficient strength to support and/or move one or more displays. In one or more examples of embodiments, the transformation assembly 200 may be connected to the system superstructure 110 by weld, bolt, adhesive or any other known or future developed method of attachment.

The track assembly 210 has a first track support member 215 and a second track support member 230. As illustrated in FIG. 2, the first and second track support members 215, 230 have a first or front end 216, 231 and a second or rear end 217, 232. Referring to FIGS. 1 and 2, the first and second track support members 215, 230 are arranged generally parallel to one another and extend longitudinally approximately parallel with the ground. The first and second track support members 215, 230 may also extend generally perpendicularly to the front screen 121. The first and second track support members 215, 230 are spaced apart from each other by a plurality of cross members or support members 212. The first and second track support members 215, 230 and cross members 212 are arranged to form an image aperture or void or opening or passageway 214 within the track assembly 210. The image aperture 214 allows the upper projection element 153 to project an unobstructed image through the track assembly 210 and to either the ceiling display 150 or floor display 160. In one or more examples of embodiments, the first and second track support members 215, 230 may be spaced apart from each other by a single cross member 212.

In FIGS. 1 and 2, the first and second track support members 215, 230 are connected to the system superstructure 110 by one or more overhead support members 213. The overhead support member 213 may be a rod or cylindrical member formed of steel, iron, wood, plastic, composite material or any other known or future developed suitable material of sufficient strength to partially support the track assembly 210 and associated first and second track support members 215, 230. The overhead support members 213 may be attached to the track assembly 210 by weld, bolt, adhesive or any other known or future developed method of attachment. In one or more examples of embodiments, a plurality of overhead support members 213 may be attached to the track assembly 210 at various locations along the first and second track support members 215, 230.

Figure 9:
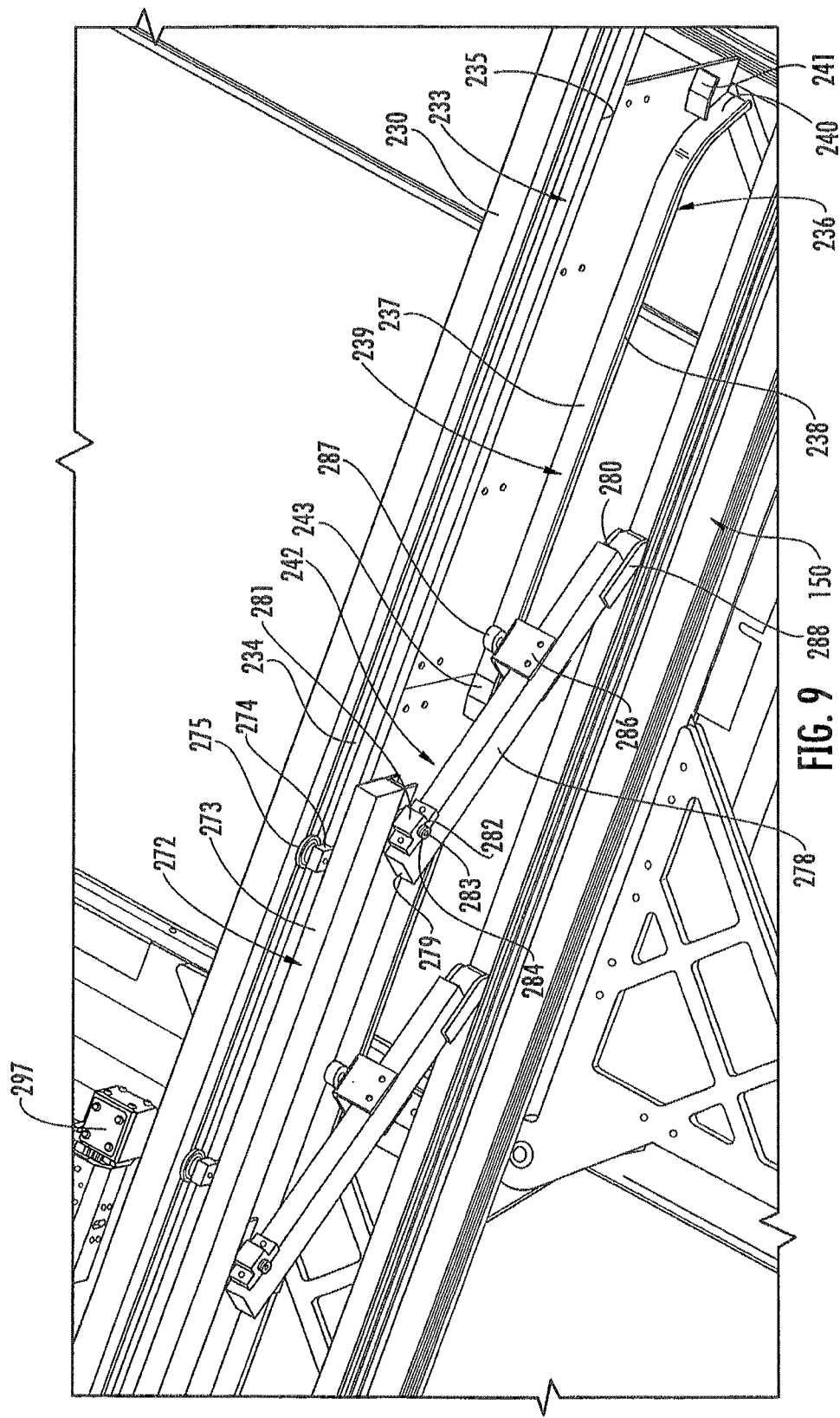
FIG. 9 is a sectional partial elevation view of the multi-display visualization system of FIG. 1, having portions cut off to show the transformation assembly taken along line 9-9 of FIG. 5.
Figure 10:
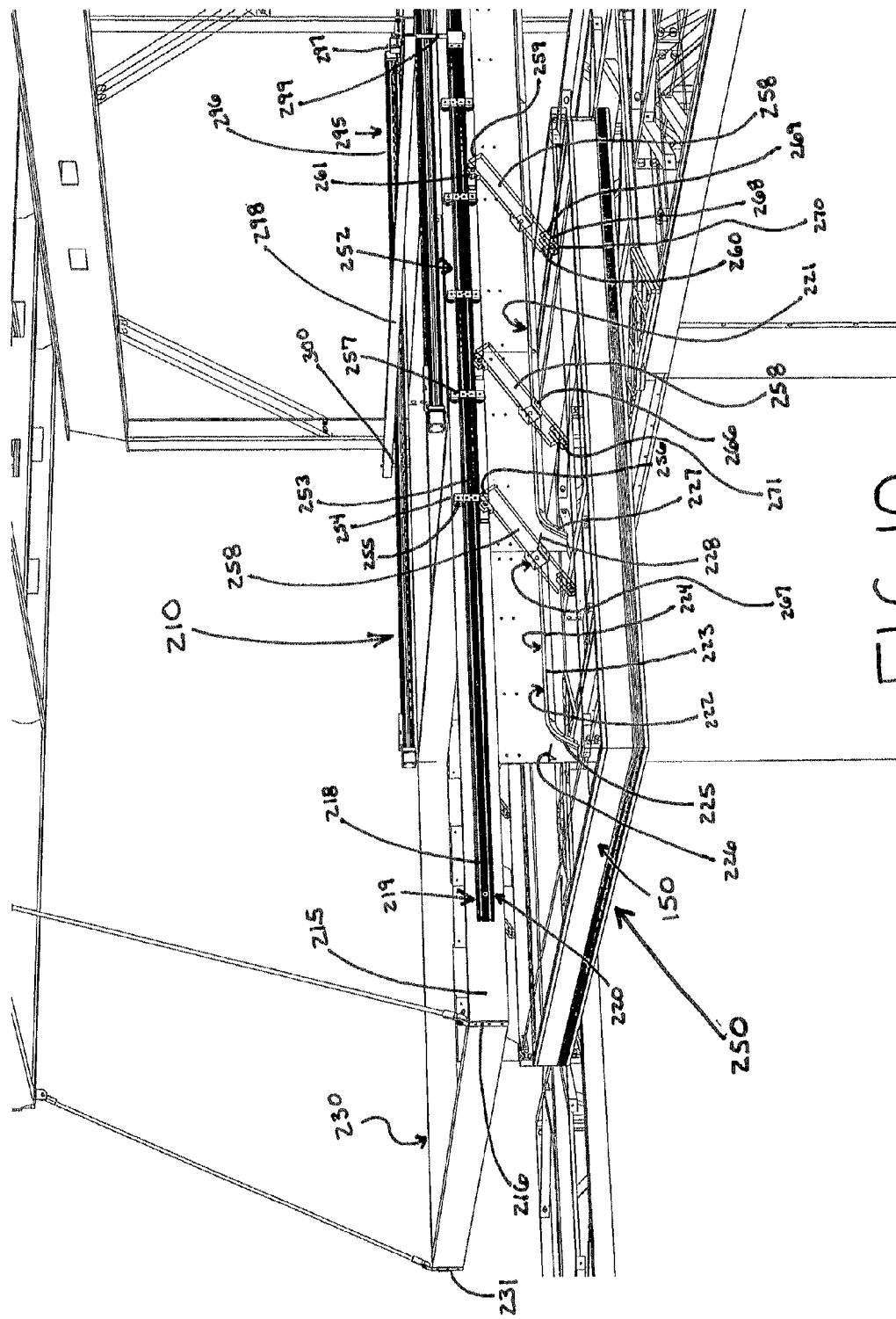
FIG. 10 is a sectional isometric view of the multi-display visualization system of FIG. 1, having portions cut off to show the transformation assembly taken along line 10-10 of FIG. 5.

The first and second track support members 215, 230 are mirror images of one another. Accordingly, the respective devices will be discussed together. Referring to FIGS. 9 and 10, first and second track support members 215, 230 may have a first or upper track assembly 218, 233. The upper track 218, 233 may extend longitudinally along the first and second track support members 215, 230. The first upper track 218 and second upper track 233 is generally parallel to one another. As illustrated, the upper track 218, 233 may include an upper channel or groove 219, 234 positioned above a lower channel or groove 220, 235. In this configuration, the upper track 218, 233 may have a cross-sectional profile in the shape of a capital "H." In one or more examples of embodiments, the upper track 218, 233 may be any suitable track assembly or linear slide providing controlled linear motion along the first and second track support members 215, 230.

Figure 11:
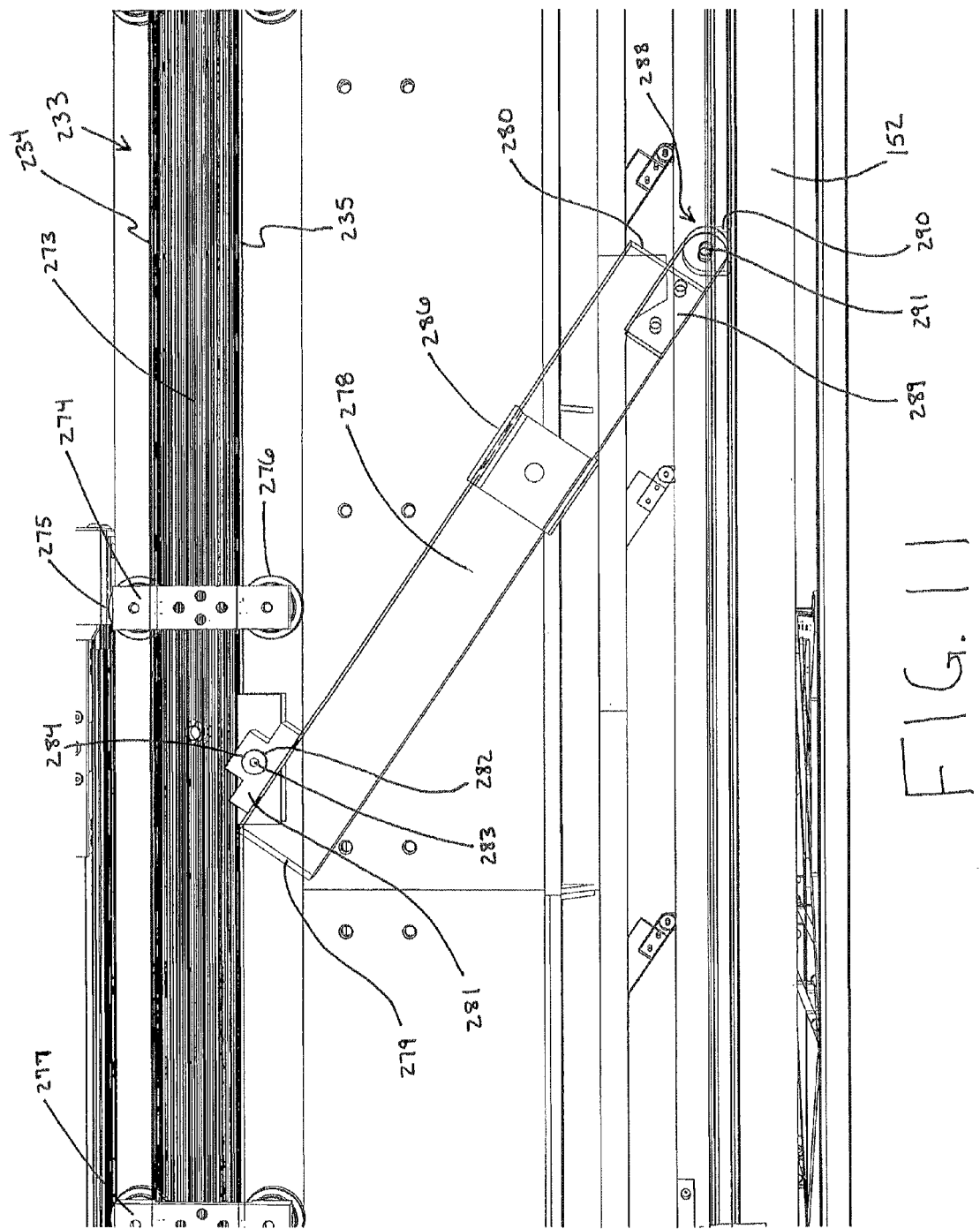
FIG. 11 is a sectional side view of the multi-display visualization system of FIG. 1, having portions cut off to show the transformation assembly taken along line 11-11 of FIG. 6.

The first track support member 215 and the associated assembly is illustrated in FIG. 10. The second track support member 230 and the associated assembly is illustrated in FIGS. 9 and 11. The first and second track support members 215, 230 include a second or lower track assembly 221, 236. As illustrated, the lower track 221, 236 is arranged below the upper track 218, 233. The lower track assembly 221, 236 extends longitudinally along the first and second track support members 215, 230. The first lower track 221 and second lower track 236 is generally parallel to one another. The lower track 221, 236 may include a track or pathway portion 222, 237. The track portion 222, 237 is arranged generally parallel to the ground and approximately perpendicular to the first and second track support members 215, 230. The lower track 221, 236 has a lip portion 223, 238. The lip portion 223, 238 is upwardly turned from and approximately perpendicular to the track portion 222, 237. The combination of the track portion 222, 237 and lip portion 223, 238 forms a lower track conduit or channel 224, 239.

As illustrated in FIG. 10, the upper track 218, 233 may extend a greater distance toward the front ends 216, 231 of the track support members 215, 230 than the lower track 221, 236.

Referring to FIGS. 9 and 10, the lower track assembly 221, 236 includes a first sloped or slanted portion 225, 240. The first sloped portion 225, 240 extends down and away from the lower track channel 224, 239 and toward the ground. The first sloped portion 225, 240 has a first track guide tab 226, 241. The first track guide tab 226, 241 may include a portion extending down from the lower track channel 224, 239 to assist in guiding an associated roller assembly.

The lower track assembly 221, 236 includes a second sloped or slanted portion 227, 242. The second sloped portion 227, 242 extends down and away from the lower track channel 224, 239 and toward the ground. The second sloped portion 227, 242 has a second track guide tab 228, 243. The second track guide tab 228, 243 may include a portion extending down from the lower track channel 224, 239 to assist in guiding an associated roller assembly. In one or more examples of embodiments, the lower track assembly 221, 236 may have one sloped or slanted portion, two sloped or slanted portions, or three or more sloped or slanted portions.

The track assembly 210 is connected to or carries the retraction assembly 250. As best illustrated in FIGS. 9 and 10, the retraction assembly 250 includes a first slidable adjustment assembly or first slidable assembly 252 and a second slidable adjustment assembly or second slidable assembly 272. The first and second slidable adjustment assembly 252, 272 are mirror images of one another. Accordingly, the respective features will be discussed together. The first and second slidable adjustment assembly 252, 272 has a slidable member or beam or bar 253, 273. The slidable member 253, 273 is arranged generally parallel to the first and second track support members 215, 230. The slidable member 253, 273 may be hollow, partially hollow or solid. The slidable member 253, 273 may be a bar or beam member, and may be shaped like a rectangular cube. In one or more examples of embodiments, the slidable member 253, 273 may be cylindrical, triangular, polygonal, or any other shape or size sufficient to guide the attached structural assembly, illustrated as the ceiling display 150.

Referring to FIGS. 9-11, a roller assembly or first roller assembly 254, 274 is connected to the slidable member 253, 273. The first roller assembly 254, 274 may include a first roller or wheel 255, 275 rotatably connected to the first roller assembly 254, 274, for example, but not limited to, by receiving and rotating about an axle connected to the first roller assembly 254, 274. The first wheel 255, 275 operably engages the upper track 218, 233 of the first and second track support members 215, 230. The first wheel 255, 275 is adapted to engage the upper channel 219, 234 of the upper track 218,233, for example, as illustrated, the first wheel 255, 275 is received within the upper channel 219, 234 of the upper track 218, 233. In one or more examples of embodiments, the first roller assembly 254, 274 may be connected to the slidable member 253, 273 by weld, bolt, adhesive, or any other known or future developed method of attachment.

The first roller assembly 254, 274 may include a second roller or wheel 256, 276 positioned below the first wheel 255, 275. The second wheel 256, 276 may be rotatably connected to the first roller assembly 254, 274, for example, but not limited to, by receiving and rotating about an axle connected to the first roller assembly 254, 274. The second wheel 256, 276 may operably engage the upper track 218, 233 of the first and second track support members 215, 230. The first wheel 255, 275 may be adapted to engage the lower channel 220, 235 of the upper track 218, 233. As illustrated, the second wheel 256, 276 may be received within the lower channel 220, 235 of the upper track 218, 233. In one or more examples of embodiments, the first roller assembly 254, 274 may include one wheel, a plurality of wheels or include a roller or bearing assembly adapted to engage the type or style of the upper track 218, 233.

The slidable member 253, 273 may include a second roller assembly 257, 277 identical to the first roller assembly 254, 274. The slidable member 253, 273 may include one roller assembly or a plurality of roller assemblies. For example, as illustrated in FIG. 10, the first slidable member 253 includes five roller assemblies identical to roller assembly 254 positioned along the slidable member 253.

Adjustably connected to the slidable member 253, 273 is a support member or adjustable display support member or beam or bar 258, 278. Referring to FIGS. 9-11, the adjustable display support member 258, 278 may be hollow, partially hollow or solid. The adjustable display support member 258, 278 may be a bar or beam member shaped like a rectangular cube. However, in one or more examples of embodiments, the adjustable display support member 258, 278 may be cylindrical, triangular, polygonal, or any other shape or size sufficient to guide the attached structure, illustrated as the ceiling display 150.

The adjustable display support member 258, 278 has a first end 259, 279 and a second end 260, 280. A bearing housing 261, 281 is connected to the adjustable display support member 258, 278 at a first position, toward the first end 259, 279. The bearing housing 261, 281 may be connected to the adjustable display support member 258, 278 by weld, bolt, adhesive, or any other known or future developed method of attachment. The bearing housing 261, 281 may include a bushing 262, 282. The bearing housing 261, 281 or bushing 262, 282 may receive a shaft 263, 283 attached to or carried by the slidable member 253, 273. As illustrated, the shaft 263, 283 is carried by a shaft attachment bracket 265, 285 connected to the slidable member 253, 273. The shaft 263, 283 may be held in engagement with the bearing housing 261, 281 by a shaft stop 264, 284. The shaft stop 264, 284 may be a threaded nut, cap or other member which engages shaft 263, 283 and has an outer diameter greater than the shaft 263, 283 and bushing 262, 282. The arrangement of the bearing housing 261, 281 and shaft 263, 283 enables the adjustable display support member 258, 278 to pivot about the shaft 263, 283 and the slidable member 253, 273 carrying the shaft 263, 283, forming a first pivotal connection. In one or more examples of embodiments, the bushing 262, 282 may be a sleeve bushing, flanged bushing, plain bearing, roller bearing or any other known or future developed bearing allowing for rotatable engagement with a shaft 263, 283.

The adjustable display support member 258, 278 includes a roller bracket assembly or lower wheel assembly or lower roller bracket 266, 286. The lower roller bracket 266, 286 may be connected or attached to the adjustable display support member 258, 278 by weld, bolt, adhesive, or any other known or future developed method of attachment. The lower roller bracket 266, 286 may be positioned at a location between the first end 259, 279 and second end 260, 280 of the adjustable display support member 258, 278. The lower roller bracket 266, 286 carries a lower wheel or roller 267, 287. The lower roller 267, 287 is rotatably connected to the lower roller bracket 266, 286, for example, but not limited to, by receiving and rotating about an axle connected to the lower roller bracket 266, 286. The lower roller 267, 287 operably engages the lower track 221, 236 of the first and second track support members 215, 230. The lower roller 267, 287 may be adapted to engage the channel 224, 239 of the lower track 221, 236, for example as illustrated, the lower roller 267, 287 is received within the channel 224, 239 of the lower track 221, 236. Accordingly, the lower roller 267, 287 may laterally move or roll along the channel 224, 239 of lower track 221, 236.

The adjustable display support member 258, 278 includes a hinge assembly 268, 288. As illustrated in FIGS. 9-11, the hinge assembly 268, 288 has a first hinge member 269, 289 connected to the adjustable display support member 258, 278 at a second position, near the second end 260, 280. The first hinge member 269, 289 may be connected by weld, bolt, adhesive, or any other known or future developed method of attachment. A second hinge member 270, 290 may be connected to the attached structural assembly, illustrated as the ceiling display screen frame 152. The second hinge member 270, 290 may be connected by weld, bolt, adhesive, or any other known or future developed method of attachment. The first hinge member 269, 289 and second hinge member 270, 290 are pivotally connected to one another by a pivot member or shaft 271, 291. The arrangement of the first hinge member 269, 289 and pivot member 271, 291 enables the adjustable display support member 258, 278 to pivot about the pivot member 271, 291 and second hinge member 270, 290, forming a second pivotal connection. This allows the adjustable display support member 258, 278 to pivot in relation to the attached structural assembly, illustrated as the ceiling display screen frame 152, without movement or deflection of the attached structural assembly or ceiling display screen frame 152. In one or more examples of embodiments, the hinge assembly 268, 288 may be a barrel hinge, pivot hinge or other hinge member enabling the first hinge member 269, 289 to pivot about the pivot member 271, 291 and second hinge member 270, 290.

The retraction assembly 250 includes plurality of adjustable display support members 258, 278. As illustrated in FIGS. 1-8 and 10, the retraction assembly 250 includes multiple, adjustable display support members which are identical to the adjustable display support members 258, 278. The illustrated retraction assembly 250 includes six adjustable display support members, three associated with the first slidable adjustment assembly 252 and three associated with the second slidable adjustment assembly 272. The adjustable display support members are spaced along the first and second slidable members 253, 273. In one or more examples of embodiments, the slidable member 253, 273 may include a single adjustable display support member 258, 278. Further, in one or more examples of embodiments, the slidable member 253, 273 may include a pair of adjustable display support members 258, 278, a plurality of pairs of adjustable display support members 258, 278, or an uneven number of adjustable display support members 258, 278.

The retraction assembly 250 may laterally move or slide along the track assembly 210 by a drive assembly 295. As shown in FIG. 10, the drive assembly 295 includes a slide member 296. The slide member 296 is arranged parallel to the first and second track support members 215, 230. Further, the slide member 296 may be positioned between the first and second track support members 215, 230. Referring to FIGS. 9 and 10, the drive assembly 295 may include an actuator or drive 297 in communication with the slide member 296, enabling motorized lateral motion along the slide member 296. An exemplary drive assembly 295 may include, but is not limited to, a lateral transmission device such as the MX BAND CYLINDER™ brand pneumatic actuator sold by TOLOMATIC, INC. (located in Hamel, Minn.). In one or more examples of embodiments, the drive assembly 295 may include pneumatic, electric, rod, screw or any other known or future developed applicable drive assembly for generating motorized lateral motion or movement. Connected to the drive assembly 295 is a control system (not shown) to control operation of the drive 297. The control system may be computerized and may include a control panel (not shown) for user operation.

The drive assembly 295 connects to the retraction assembly 250 by a drive cross member 298. As illustrated in FIG. 10, the drive cross member 298 is arranged approximately perpendicular to the first and second track support members 215, 230. The drive cross member 298 includes a first attachment rod 299 and a second attachment rod 300. The first attachment rod 299 attaches or connects to the first slidable adjustment assembly 252. The second attachment rod 300 attaches or connects to the second slidable adjustment assembly 272. The drive cross member 298 is placed in communication or attached to the drive assembly 295 to move the retraction assembly 250 laterally along the track assembly 210. In one or more examples of embodiments, the drive assembly 295 is directly connected to the retraction assembly 250 to provide lateral motion. Further, in one or more examples of embodiments, the drive assembly 295 may be connected to the retraction assembly 250 in any known or future developed manner to provide lateral motion to the retraction assembly 250 in relation to the track assembly 210.

The multi-display visualization system 100 may include one or more sensors for detecting movement. The sensors (not shown), may be connected or attached at various locations, including, but not limited to, the ceiling display 150, the displays 120, 130, 140, 160, the track assembly 210, or the retraction assembly 250. In one or more examples of embodiments, a plurality of sensor groups or sets may be connected to visualization system 100, for example, but not limited to, a first set connected to the ceiling display 150 and a second set connected to the track support members 215, 230. In accordance with the present invention, the first set may be movable with the ceiling display 150 while the second set may be stationary or non-movable with the track support members 215, 230.

In operation and use, lateral movement of the retraction assembly 250 about the track assembly 210, and associated retraction of the attached structural assembly, illustrated as ceiling display 150, may be accomplished by user actuation of the control system (not shown). For example, a user may input a command through a control panel (not shown) to raise or retract the ceiling display 150. As illustrated in FIGS. 1 and 2, the ceiling display 150 is positioned in the "closed" or "ceiling" configuration. In the closed configuration, the ceiling display 150 is completely withdrawn or extended, enabling the upper projection element or projector 153 to project an upper or ceiling image 154 onto the ceiling display 150, illustrated by broken lines. The ceiling display 150 may be used alone, or in combination with the horizontal displays 120, 130, 140. In this configuration, the multi-display visualization system 100 can produce and display an image visible on the ceiling display 150.

A user may input a command to the control system (not shown) directing the ceiling display 150 to retract, activating drive assembly 295. The drive assembly 295 precisely controls the speed ceiling display 150 retracts by generating lateral force which is transferred to the retraction assembly 250. In accordance with the present invention, the drive assembly 295 drives cross member 298 toward the rear ends 217, 232 of track support members 215, 230. The applied force translates to the retraction assembly 250, and specifically the first and second slidable adjustment assemblies 252, 272. The first and second slidable adjustment assemblies 252, 272 are drawn toward the rear of the multi-display visualization system 100, away from the front display 120. Correspondingly, the first and second slidable adjustment assemblies 252, 272, and specifically the slidable members 253, 273 and attached roller assemblies 254, 274 slide along the upper track 218, 233 toward the rear ends 217, 232 of track support members 215, 230 and toward the rear of the multi-display visualization system 100, away from the front display 120.

Figure 3:
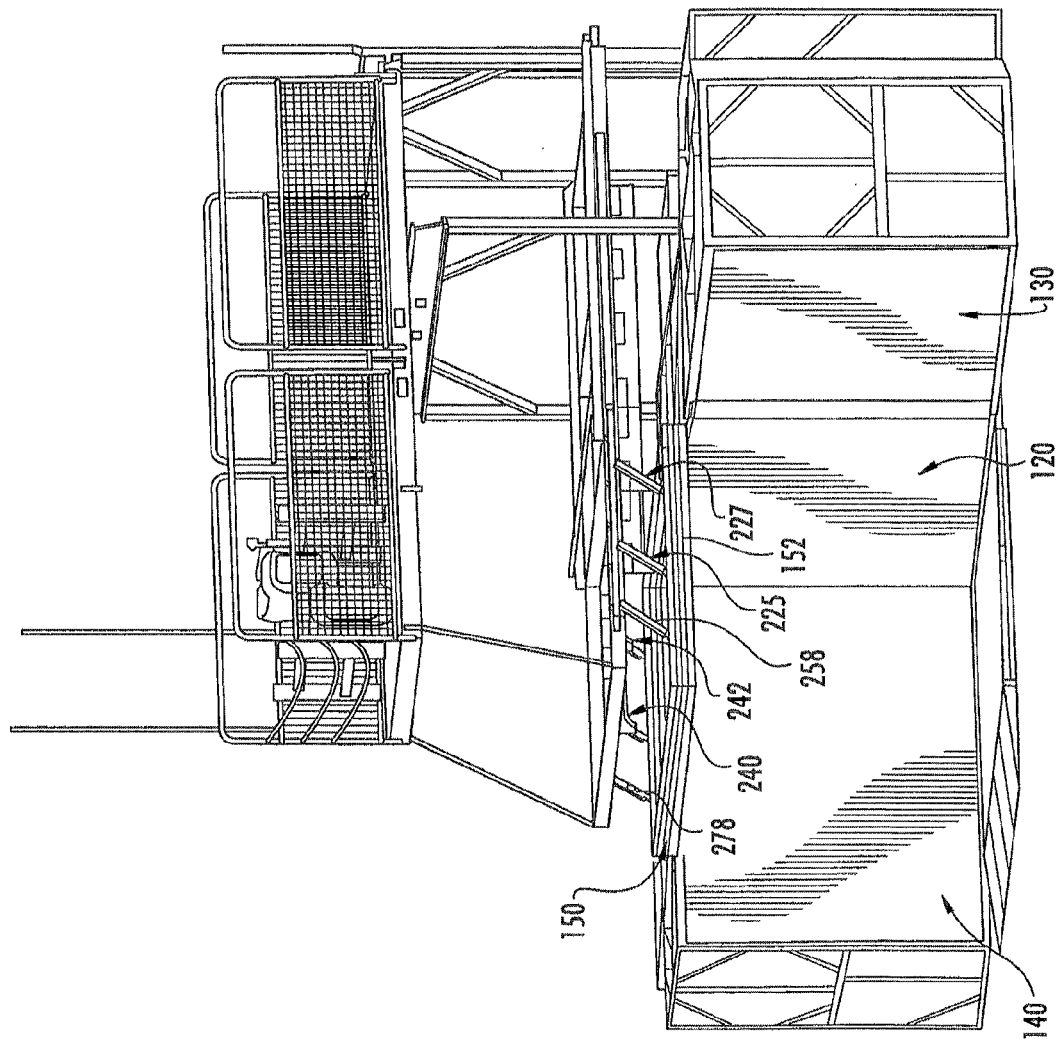
FIG. 3 is a side elevation view of the multi-display visualization system of FIG. 1 having the transformation assembly attached thereto with the ceiling display in the lifting position.
Figure 4:
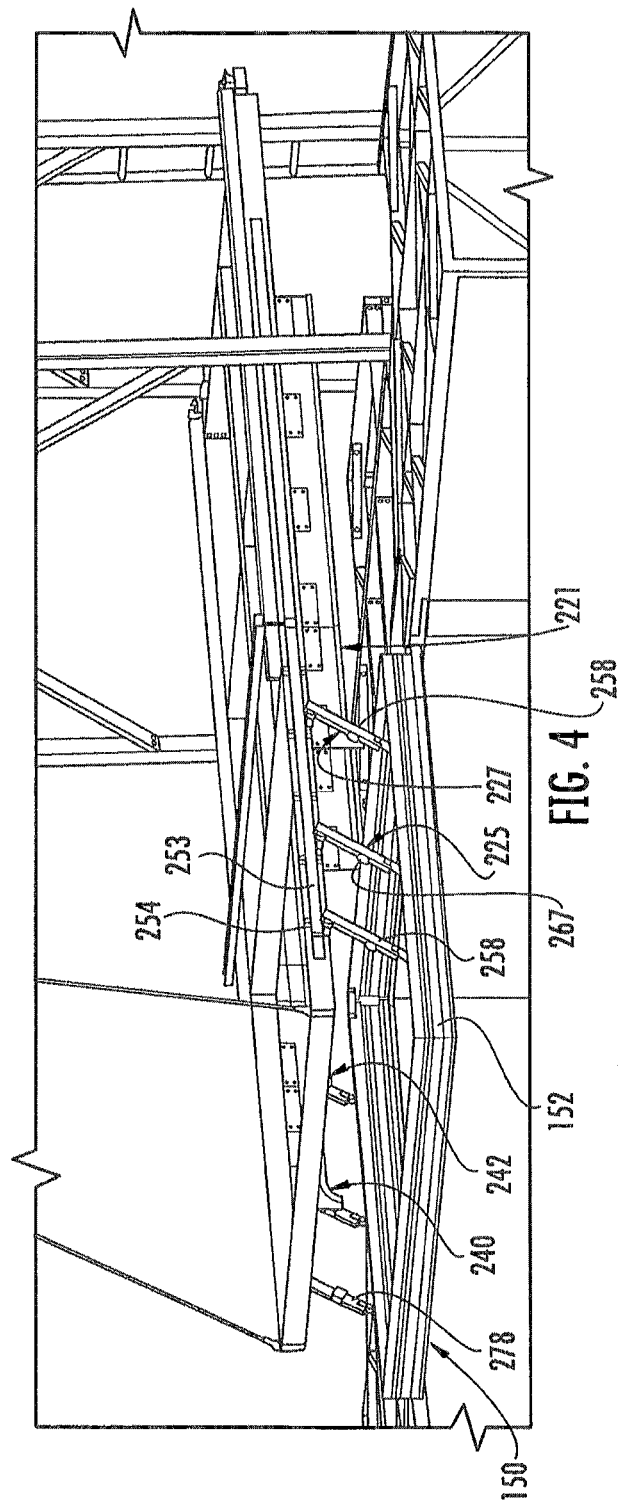
FIG. 4 is a sectional isometric view of the multi-display visualization system of FIG. 1, having portions cut off to show the transformation assembly having the ceiling display attached thereto in the lifting position.

Simultaneously, the ceiling display 150 begins to raise upward and away from the horizontal displays 120, 130, 140. Specifically, as the slidable members 253, 273 and attached roller assemblies 254, 274 slide along the upper track 218, 233, the slidable members 253, 273 translate force to the adjustable display support members 258, 278. The lower rollers 267, 287 are drawn rearward along the channel 224, 239 of the lower track 221, 236. As shown in FIGS. 3 and 4, the lower rollers 267, 287 move upward along the respective first sloped portion 225, 240 and second sloped portion 227, 242 of the lower track 221, 236. This results in the adjustable display support members 258, 278 pivoting toward the first end 259, 279 about shaft 263, 283 and pivoting toward the second end 260, 280 about pivot member 271, 291. The resulting dual pivot decreases the angle formed between the adjustable display support members 258, 278 and the attached ceiling screen frame 152 of the ceiling display 150. As the angle decreases, the ceiling display 150 moves upward as a single unit, maintaining the alignment of the ceiling display 150 with the horizontal displays 120, 130, 140. Accordingly, the above precision controlled retraction of the ceiling display 150 maintains all alignment tolerances necessary to preserve a seamless image with the horizontal displays 120, 130, 140. Further, the ceiling display 150 and associated ceiling screen 151 does not warp or twist during the lifting process. The retraction assembly 250, and specifically the first and second slidable adjustment assemblies 252, 272, slidable members 253, 273 and adjustable display support members 258, 278 retract without creating much sound. Specifically, the arrangement and interaction of the roller assemblies 254, 274 with the upper track 218, 233 and the lower rollers 267, 287 with the lower track 221, 236 allows for smooth, easy rolling and/or lateral movement, enabling the roller assemblies 254, 274 and rollers 267, 287 to traverse the respective upper track 218, 233 and lower track 221, 236 without obstruction, limiting unwanted sound. In addition, the precision controlled speed of retraction by the drive assembly 295 limits generation of sound.

Figure 5:
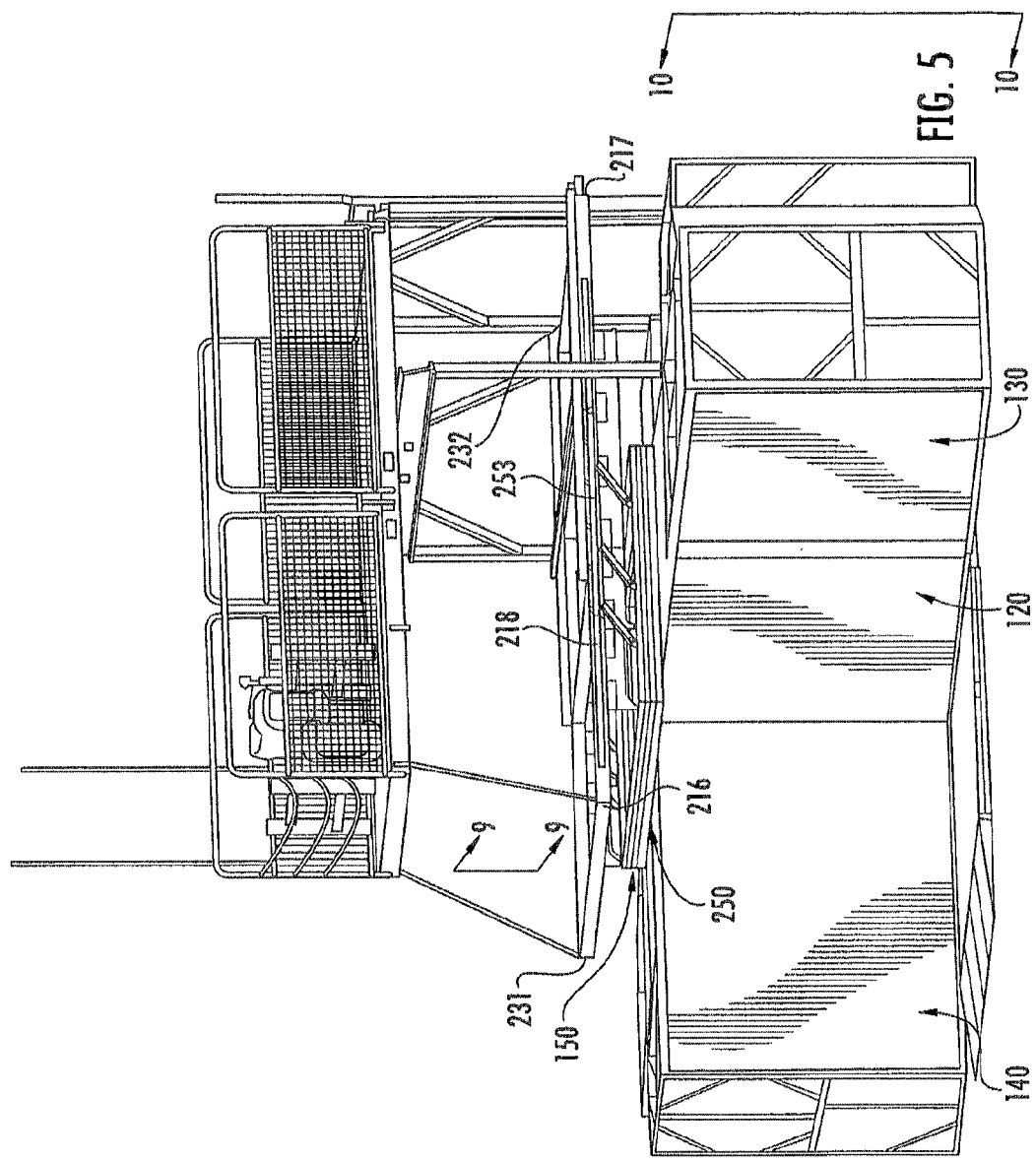
FIG. 5 is a side elevation view of the multi-display visualization system of FIG. 1 having the transformation assembly attached thereto with the ceiling display in the retracting position.
Figure 6:
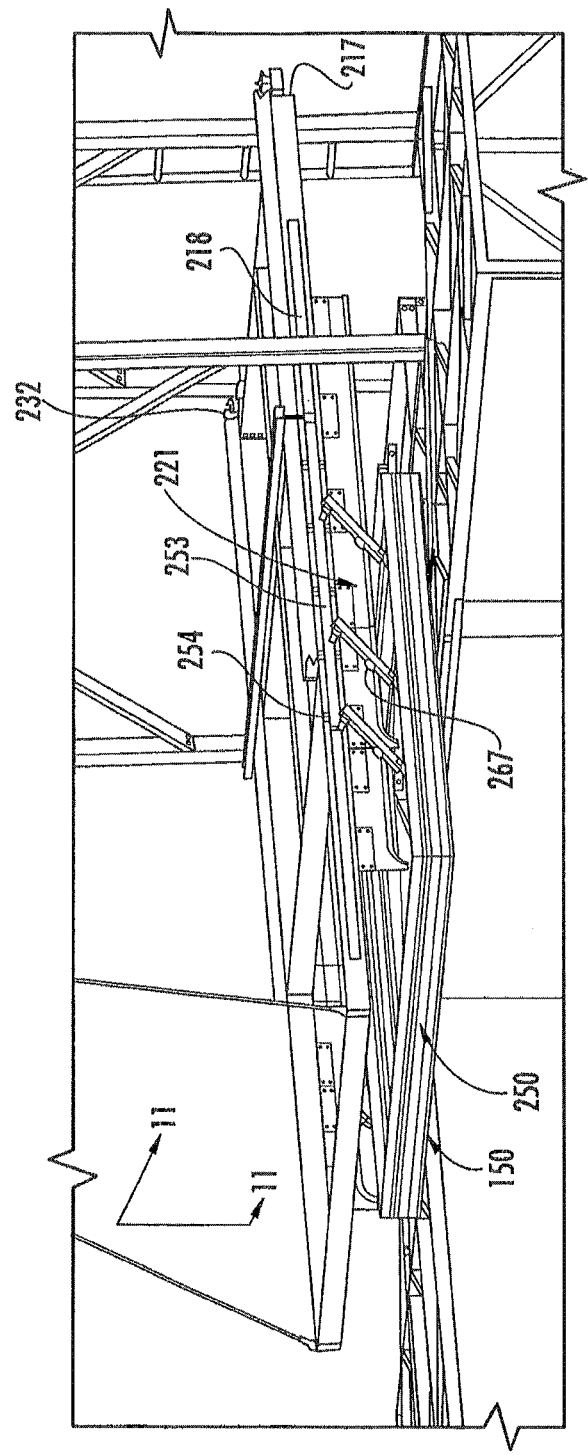
FIG. 6 is a sectional isometric view of the multi-display visualization system of FIG. 1, having portions cut off to show the transformation assembly having the ceiling display attached thereto in the retracting position.

Once the lower rollers 267, 287 have completely traversed the respective first sloped portion 225, 240 and second sloped portion 227, 242 of the lower track 221, 236, the lifting process is complete. At this position, the retraction assembly 250 begins to "retract" the ceiling display 150. Referring to FIGS. 5 and 6, the slidable members 253, 273 and attached roller assemblies 254, 274 slide or traverse along the upper track 218, 233. Simultaneously, the lower rollers 267, 287 slide or traverse along the lower track 221, 236. Both the slidable members 253, 273 and lower rollers 267, 287 slide or traverse toward the rear ends 217, 232 of the track support members 215, 230. As a lower roller 267, 287 moves rearward and approaches a slanted portion 225, 227 or 240, 242, the track guide tabs 226, 228 or 241, 243 guides the respective lower roller 267, 287 across an open area near the slanted portion 225, 227 or 240, 242, insuring the lower roller 267, 287 maintains contact with the lower track 221, 236.

Once the retraction assembly 250 slidable members 253, 273 and attached roller assemblies 254, 274 completely slide or traverse along the upper track 218, 233, the attached ceiling display 150 is completely retracted and in the "open" or "floor" configuration. In this configuration, and as illustrated in FIGS. 7 and 8, the upper projection element or projector 153 may project a lower or floor image 164 onto the floor display 160, illustrated by broken lines. To project the floor image 164, the ceiling display 150 is raised or retracted, enabling the upper projection element 153 to project an unobstructed floor image 164 to the floor display 160. The floor display 160 can used alone, or in combination with the horizontal displays 120, 130, 140.

Upon completion of operation of the multi-display visualization system 100 in the "floor" configuration, a user may return the multi-display visualization system 100 to the "ceiling" configuration. A user may input a command to the control system (not shown) directing the ceiling display 150 to extend outward, resulting in the activation of drive assembly 295. The drive assembly 295 precisely controls the return or extension outward of the ceiling display 150 by generating lateral force which is transferred to the retraction assembly 250. In accordance with the present invention, the drive assembly 295 will precisely control the speed of return by driving the drive cross member 298 toward front ends 216, 231 of track support members 215, 230 and toward the front of the multi-display visualization system 100, toward the front display 120. The applied force will translate to the retraction assembly 250, and specifically the first and second slidable adjustment assemblies 252, 272. Accordingly, the first and second slidable adjustment assemblies 252, 272, and specifically the slidable members 253, 273 and attached roller assemblies 254, 274 slide along the upper track 218, 233 toward front ends 216, 231 of track support members 215, 230 and toward the front of the multi-display visualization system 100.

Simultaneously, the first and second slidable adjustment assemblies 252, 272, and specifically the slidable members 253, 273 translate force to the adjustable display support members 258, 278. In turn, the adjustable display support members 258, 278 translates force to the lower rollers 267, 287, which in turn slide or traverse forward along the lower track 221, 236. Accordingly, the ceiling display 150 moves toward the front ends 216, 231 of track support members 215, 230. This is illustrated by the changing position of the retraction assembly 250 and ceiling display 150 from FIGS. 7 and 8 to FIGS. 5 and 6.

The retraction assembly 250 moves forward, toward the front screen 121 of the front display 120, traversing along the upper track 218, 233 and lower track 221, 236. As the lower rollers 267, 287 move forward and approaches a slanted portion 225, 227 or 240, 242, the track guide tabs 226, 228 or 241, 243 assist to guide the respective lower roller 267, 287 across any open area near the slanted portion 225, 227 or 240, 242, insuring the lower roller 267, 287 maintains contact with the lower track 221, 236.

Once the adjustable display support member 258, 278 nearest the rear ends 217, 232 of the track support members 215, 230 reaches the nearest sloped portion 227, 242, illustrated as the second sloped portion 227, 242 in FIGS. 9 and 10, the retraction assembly 250 and attached ceiling display 150 initiates the "lowering" phase. As shown in FIGS. 3 and 4, lower rollers 267, 287 are pushed forward along the channel 224, 239 of the lower track 221, 236 and downward along the respective first sloped portion 225, 240 and second sloped portion 227, 242 of the lower track 221, 236. This results in the adjustable display support members 258, 278 to pivot toward the first end 259, 279 about shaft 263, 283 and pivot toward the second end 260, 280 about pivot member 271, 291. The resulting pivotal or dual pivot movement increases the angle formed between the adjustable display support members 258, 278 and the attached ceiling screen frame 152 of the ceiling display 150. The increase in angle is illustrated by the changing position of the retraction assembly 250, adjustable display support members 258, 278 and ceiling display 150 from FIGS. 3 and 4 to FIGS. 1 and 2. As the angle increases, the ceiling display 150 moves downward as a single unit, maintaining the alignment of the ceiling display 150 with the horizontal displays 120, 130, 140. Accordingly, the retraction assembly 250 precisely returns or lowers ceiling display 150, as the ceiling display 150 maintains all alignment tolerances necessary to preserve a seamless image with the horizontal displays 120, 130, 140. Further, the ceiling display 150 and associated ceiling screen 151 does not warp or twist during the lowering process.

Once the slidable members 253, 273 and attached roller assemblies 254, 274 completely slide along the upper track 218, 233 and the lower rollers 267, 287 have completely traversed the respective first sloped portion 225, 240 and second sloped portion 227, 242 of the lower track 221, 236, the lowering process is complete. As illustrated in FIGS. 1 and 2, the ceiling display 150 is positioned in the "closed" or "ceiling" configuration. In this configuration, the multi-display visualization system 100 can produce and display the ceiling image 154 visible on the ceiling display 150.

The foregoing embodiments provide advantages over currently available devices. The transformation assembly and associated features described herein provides a user of a multi-display visualization system the option to display an image on either a ceiling display or on a floor display without necessitating the added expense or cost of a fixed installation and the aforementioned limitations inherent therewith. Further, the transformation assembly does not limit a user to selecting either a floor display or a ceiling display. The transformation assembly described herein allows for selective retraction and return of an overhead or ceiling display. By retracting the overhead display or screen, a user has the option of having both a ceiling and floor display, instead of selecting one or the other. Additionally, the transformation assembly provides for retraction of an overhead or ceiling display without adversely affecting the displayed image. The assembly retracts the ceiling display by first lifting the ceiling display or screen as a single unit, followed by lateral retraction of the ceiling display or screen. The precision controlled retraction enables the ceiling display or display screen to remain square throughout the retraction process. Accordingly, once a ceiling display or screen in retracted and then returned, the displayed image is clear without image distortion or warping from the ceiling display or screen. Further, the precision controlled retraction and return allows for a seamless image between the ceiling display and one or more horizontal displays. The combination of lateral movement and raising and lowering movement retracts and then returns the ceiling display or screen to the same location, insuring a seamless display between the ceiling display and surrounding displays. A seamless display is important for an accurate immersive visualization system. In addition to image accuracy, visualization systems may incorporate sensors for detecting movement. The positioning of the sensors are important for proper operation. Accordingly, the sensors may be attached to a ceiling display or screen, moved by the transformation assembly, and returned to the same location, enabling proper and consistent operation. To further avoid potential damage to the ceiling display or screen, the transformation assembly precisely controls the speed of retraction and return. In addition, the transformation assembly is motorized and automatic, allowing a user to easily retract or replace the ceiling display or screen. Further, during operation the transformation assembly does not make much sound, allowing for quiet retraction and replacement of a ceiling display or screen.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references, including but not limited to, upper, lower, upward, downward, left, right, leftward, rightward, top, bottom, above, below, vertical, horizontal, clockwise, counterclockwise, x-axis, y-axis, and z-axis, central, are only used for identification purposes to aid the reader's understanding of the embodiments of the present invention, and do not create limitations, particularly as to the position, orientation, or use of the invention unless specifically set forth in the claims. Joinder references (e.g., attached, coupled, connected) are to be construed broadly and may include intermediate members between a connection of elements and relative movement between elements. As such, joinder references do not necessarily infer that two elements are directly connected and in fixed relation to each other.

In some instances, components are descried with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member. In methodologies directly or indirectly set forth herein, various steps and operations are described in one. possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to certain embodiments, persons skilled in the art will recognize that changes may be made in form and detail without departing from the spirit and scope of the invention.

What is claimed is:

1. A display retraction assembly for a multi-display visualization device comprising:
    a system superstructure connected to a transformation assembly, said transformation assembly comprising:
        a first track in a first vertical plane;
        a second track in a second vertical plane offset from the first track; and
        a display support member operably connected to the first track and second track;
    a first display connected to the display support member wherein the display is movable simultaneously with the display support member along the first track and second track;
    a second display connected to said system superstructure;
    said first display selectively movable between retracted and display configurations;
    said first display displaying content when said first display is in said display configuration;
    said second display displaying said content when said first display is in said retracted configuration; and
    wherein the second track further comprises a pathway portion and a sloped portion, the pathway portion longitudinally extending parallel to the first track and the sloped portion extending at an angle away from the pathway portion.

2. The display retraction assembly of claim 1, wherein the first track and second track are connected to a track support member.

3. The display retraction assembly of claim 2, wherein the first track is positioned above the second track.

4. The display retraction assembly of claim 1, further comprising:
    a beam pivotally connected to the display support member at a first position, the beam connected to the first track and adapted to enable movement along the first track; and
    a hinge assembly pivotally connecting the display support member at a second position to the first display.

5. The display retraction assembly of claim 4, further comprising a plurality of display support members pivotally connecting the beam to the first display.

* * * * *